United States Patent [19]
Kustka et al.

[11] Patent Number: 5,367,336
[45] Date of Patent: Nov. 22, 1994

[54] TRUNCATION ERROR CORRECTION FOR PREDICTIVE CODING/ENCODING

[75] Inventors: George J. Kustka, Marlboro; John N. Mailhot, Somerville, both of N.J.

[73] Assignee: AT&T Bell Laboratories, Murray Hill, N.J.

[21] Appl. No.: 910,592

[22] Filed: Jul. 8, 1992

[51] Int. Cl.$^5$ ............................................. H04N 7/137
[52] U.S. Cl. ............................ 348/416; 348/701
[58] Field of Search ............... 358/133, 136, 138, 167, 358/36; 348/416, 701; H04N 7/137

[56] References Cited

U.S. PATENT DOCUMENTS 5,055,843 10/1991 Ferguson ............................. 375/28
5,128,756 7/1992 Johnston ............................. 358/136

Primary Examiner—Howard W. Britton
Attorney, Agent, or Firm—Henry T. Brendzel

[57] ABSTRACT

Apparatus for eliminating the truncation errors associated with a multiplicative leak factor employed in a predictive coding arrangement adds a temporally varying control signal that affects the leak factor multiplication output. Specifically, in one embodiment the leak factor multiplication output is modified by arbitrarily changing, or dithering, the level of the mean signal. In another embodiment, the leak factor multiplication output is modified by effectively dithering the leak factor itself. The latter is accomplished by adding the varying control signal prior to the truncated division which occurs in the leak factor multiplication process.

16 Claims, 3 Drawing Sheets

TRUNCATION ERROR CORRECTION FOR PREDICTIVE CODING/ENCODING

BACKGROUND OF THE INVENTION

This invention relates to encoding of signals and, more particularly, to differential encoding of television signals comprising concatenated frame signals.

FIGS. 1 and 2 describe in general terms the prior art encoder disclosed in U.S. Pat. No. 5,128,756, issued Jul. 7, 1992. In the process carried out in the FIG. 1 arrangement, a frame signal is applied to element 9 where the mean of the signal is subtracted. The output of element 9 is applied to element 11 where a prediction of the frame signal is subtracted. The resulting signal, which in effect is a measure of prediction error, is applied to coder 12 and the output of the coder is transmitted to a destination receiver. The output of the coder is also applied to a corresponding decoder 13 which to the best of its ability reconstitutes the prediction error signal of element 11. Adding the prediction signal to the output of decoder 13, via adder 14, yields a reconstituted frame signal itself (first coded and then decoded) and that signal is stored in memory 15. For the next frame of the input signal the stored frame signal is augmented by displacing, in block 16, signal portions with applied motion vectors and by subtracting the mean signal from the motion displaced frame. This is accomplished in element 17. Lastly, the signal developed by element 17 is multiplied by a leak factor in element 18 to form the prediction signal for the current frame of the input signal.

In a receiver that accepts the coded signals developed and transmitted by coder 12, such as the receiver depicted in FIG. 2, a similar decoding arrangement is found. The received signal is first decoded in element 23 (as in element 13), and adder 24 adds thereto a prediction signal that is developed from a previous frame signal stored in buffer 25. That prediction signal corresponds to the stored frame signal displaced by received motion vectors in element 26, with a received mean subtracted therefrom in element 21 prior to being multiplied by a received leak signal in block 22. The decoded signal and the added prediction signal are augmented in adder 27 by the received mean signal to form a decoded frame signal, and that signal is stored in buffer 25.

The leak factor is introduced in the transmitter in recognition of the fact that the receiver and the transmitter will not always track each other. Aside from noise perturbations, it is clear that a TV receiver freshly tuning into a particular transmitter cannot have data in its buffer that corresponds to the data in the transmitter's storage 15. The leak allows coder 12 to encode a fraction of the input frame signal, and this fraction is communicated to the receiver. Because of the leak factor, the data in the receiver buffer reaches the level of the data in storage 15 within a few frame intervals and is thus synchronized to the transmitter. When the leak factor is 0, no prediction takes place and the receiver is brought into synchronization within a single frame. A somewhat larger leak requires a larger number of frames of the input signal before the data in the receiver's buffer is synchronized with the data in storage 15.

The arrangement of FIG. 1 can operate in analog as well as in digital environments. Some of the current efforts to design an HDTV system for the U.S. are directed to a digital implementation. In the aforementioned U.S. Patent, the thinking was to employ a leak factor that, in accordance with characteristics of the transmitted signal, varies in steps of 1/16, from 0 to 15/16. These steps were selected, in part, because in digital implementations it is very easy to realize division by a power of 2. Each shift of the signal by 1 bit corresponds to a division by 2. Thus, multiplying by 3/16, for example, can be easily accomplished by multiplying by 3 and then shifting the signal by 4 bits.

Alas, this simplicity comes at a price, and the price is loss of the fractional part of the quotient that a proper division may produce. This can be appreciated best, perhaps, from the following example where the leak factor is 15/16 and where multiplication by the 15/16 leak factor is accomplished by shifting the signal by 4 bits and subtracting the shifted signal from the unshifted signal (i.e, evaluating S-(1/16)S, where S is the signal). The structure for carrying out this 15/16 multiplication is illustrated in FIG. 1 by shift circuit 181 followed by subtractor circuit 182. Whereas on first blush the FIG. 1 structure appears to truly effect a 15/16 multiplication, actually it introduces a truncation error because the computations are carried out in integer arithmetic. To illustrate, when the signal S is 128, then (15/16)S is 120; but so is the output for any other signal level between 121 and 133.

Understandably, it is highly desirable to eliminate the artifacts that come about from the truncation error restilting from use of integer arithmetic.

SUMMARY OF THE INVENTION

The truncation errors associated with the leak factor are eliminated by temporal control of the leak factor multiplication output. Specifically, in one embodiment the leak factor multiplication output is modified by arbitrarily changing, or dithering, the level of the mean signal. The manner of changing the mean signal is not necessarily crucial, except that it should be sufficiently robust to eliminate the artifacts regardless of the signal's level. In another embodiment, the leak factor multiplication output is modified by dithering the leak factor itself.

DETAILED DESCRIPTION

Figure 1:
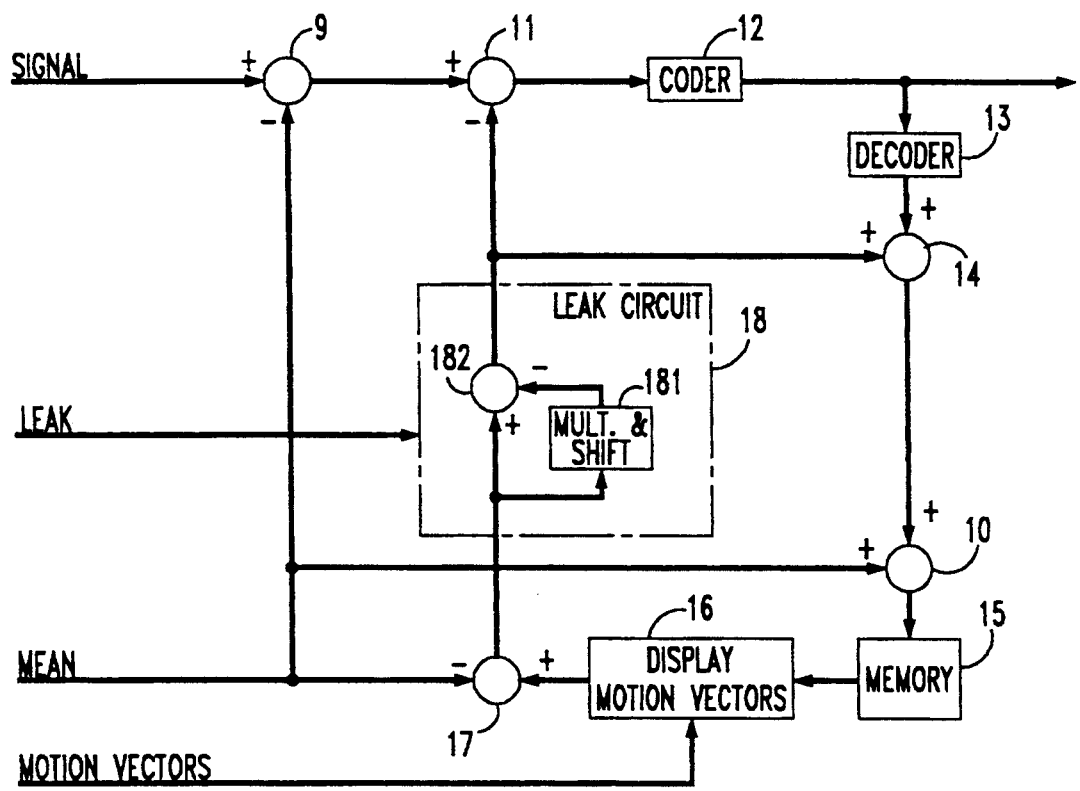
FIGS. 1 and 2 describe in general terms a prior art encoder.

To better understand the artifacts generated by the truncation error in the leak factor multiplication circuitry it is useful to examine the behavior of the transmitter and the receiver circuit for a flat background signal that, for example, comprises a zero mean signal of level 129 and a leak factor of 15/16. If the signal level has been steady for a while, it can be safely assumed that the transmitter frame buffer storage 15 also contains the level 129. Elements 16 and 17 are out of consideration because the signal has zero mean and because the image is "flat" and therefore there are no displacement vectors, and thus, the output of block 18 is 129 minus 129 shifted by 4 bits (1/16) and truncated. The latter operation yields 8, and hence the result is 121. The level 121 is applied to element 11, yielding an output of 8, and the value 8 is encoded and sent to the receiver.

If the receiver begins with no data in its buffer, the receiver will accumulate data in the sequence 8, 16, 23, 30, 37, 43 . . . . 126, 127, 128, 128, 128 . . . . . First, it may be noted that the receiver does converge to a number that approximates the true input signal (129), and second, it may be noted that the number to which the receiver converges is 128. Since all transmitter input signals in the range 128–143 yield the number 8 when shifted by 4 bits, it follows that all such input signals will develop the output 128 at the receiver.

In accordance with the principle of this invention, the artifact introduced by the truncation error is eliminated by modifying the operational output of the leak factor multiplication circuit and by correspondingly modifying the receiver. This modifying artificially increases the shifted signal a sufficient number of times to compensate for the truncation that occurs by virtue of the shifting operation.

Figure 2:
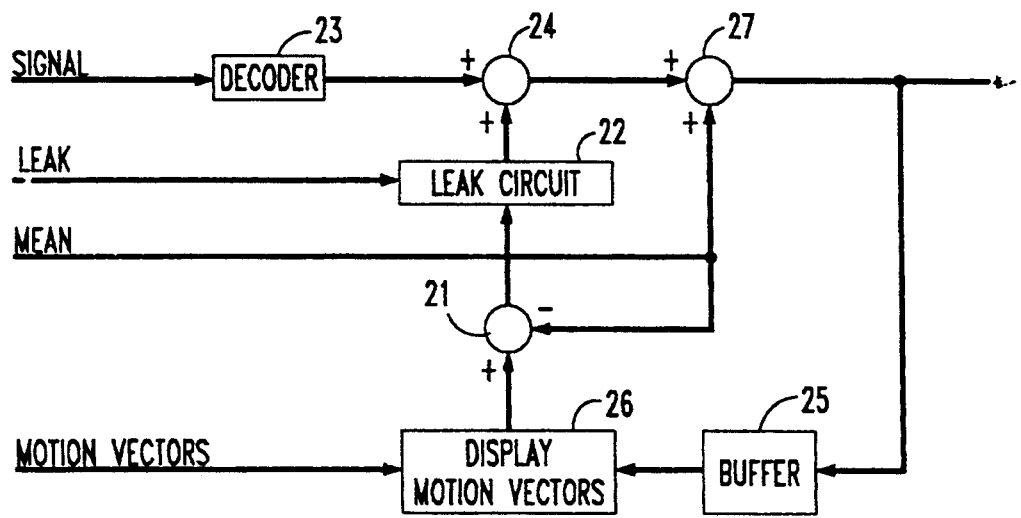
Figure 3:
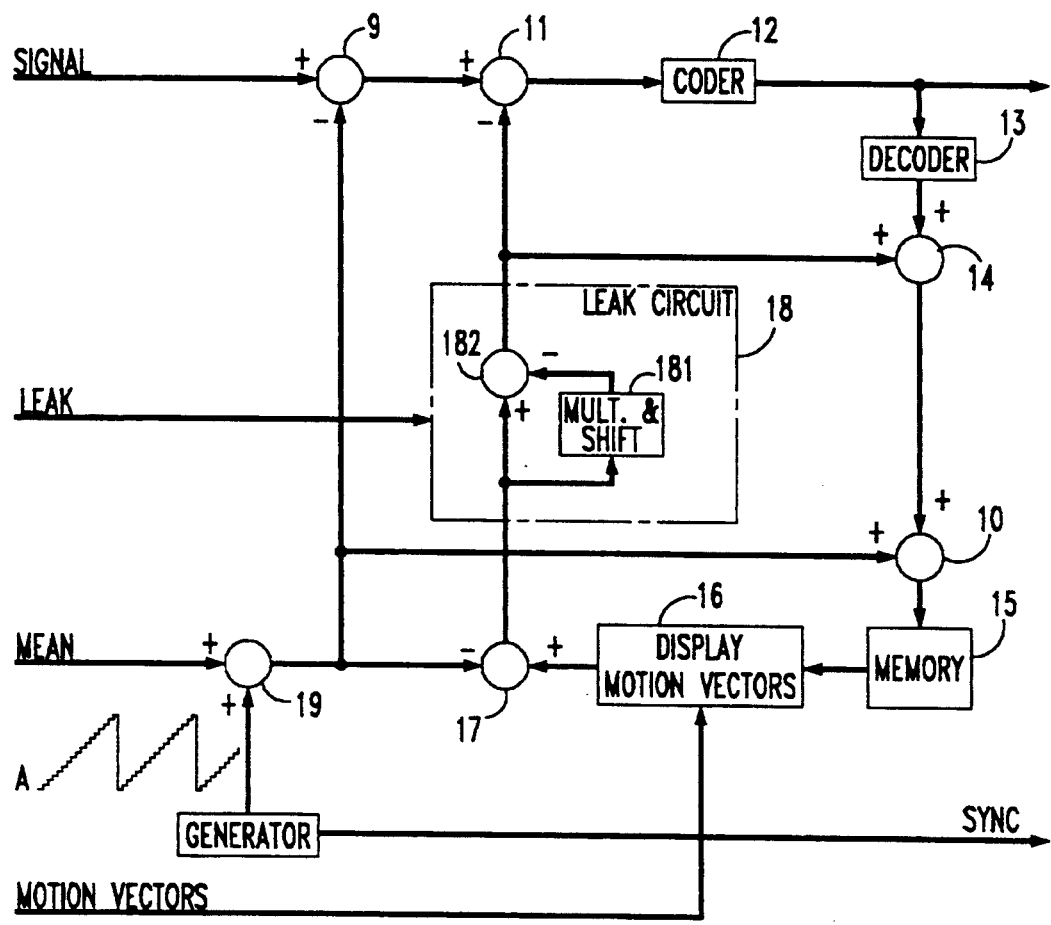
FIGS. 3 and 4 present one transmitter and receiver embodiment of this invention.
Figure 4:
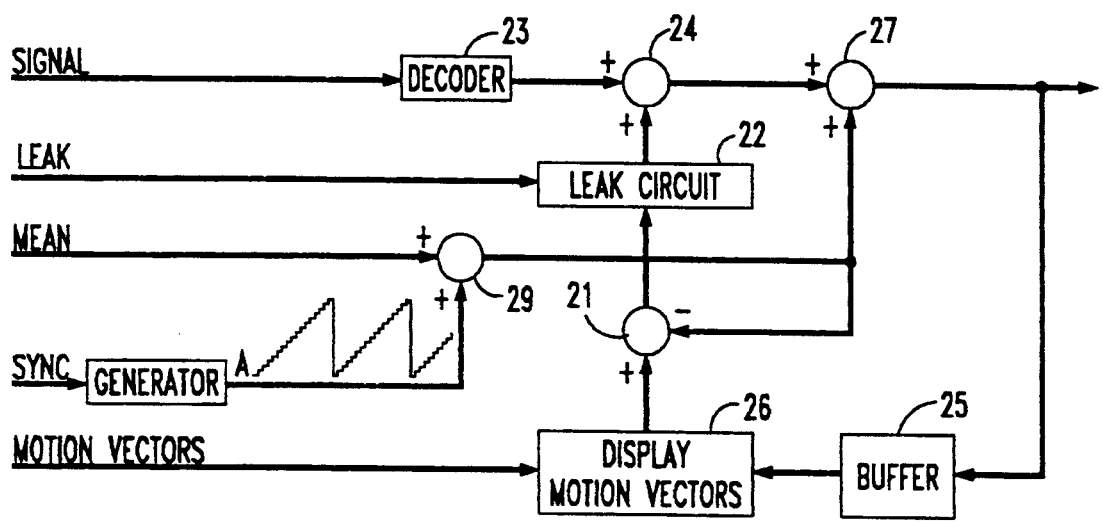

FIGS. 3 and 4 present one transmitter and receiver embodiment that carries out the principles of this invention. The FIG. 3 structure is identical to that of FIG. 1, except that an adder circuit 19 is interposed between the mean signal and subtractors 12 and 17, which adds augmentation signal A to the mean. Signal A can have any form that satisfies the condition specified below; to wit, when circuit 181 shifts the signal by m bits, the amplitude of signal A must be in the range 0 to $2^m-1$ and each level in that range must occurs with equal probability. A regular pattern such as a sawtooth ramp shape is, perhaps, easiest to achieve, although a pseudorandom pattern, for example, is also acceptable. A particularly useful and easily developed signal A is a ramp signal with the bits reversed (the most significant bit becomes the least significant bit, etc.) As in connection with FIG. 3, the FIG. 4 circuit is identical to the FIG. 2 circuit, except that the mean signal is augmented by the addition of signal A via adder 29. It may be noted that signal A is preselected, so it does not need to be transmitted to the receiver.

It may be noted that element 181 is designated as "mult & shift" element. In the example above the multiplication is by 1 (1/16) because the desired fraction was 15/16. Should a different fraction be called for, multiplication may be necessary. For example, the fraction 7/8 calls for multiplication by 2, then a shift, and then a subtraction from 1. In the most general embodiment, in fact, multiplication (either by successive addition or otherwise) followed by truncated division (e.g. by shifting) is what is called for. It is the truncated division that, in accordance with this invention, is preceded with the addition of signal A.

Figure 5:
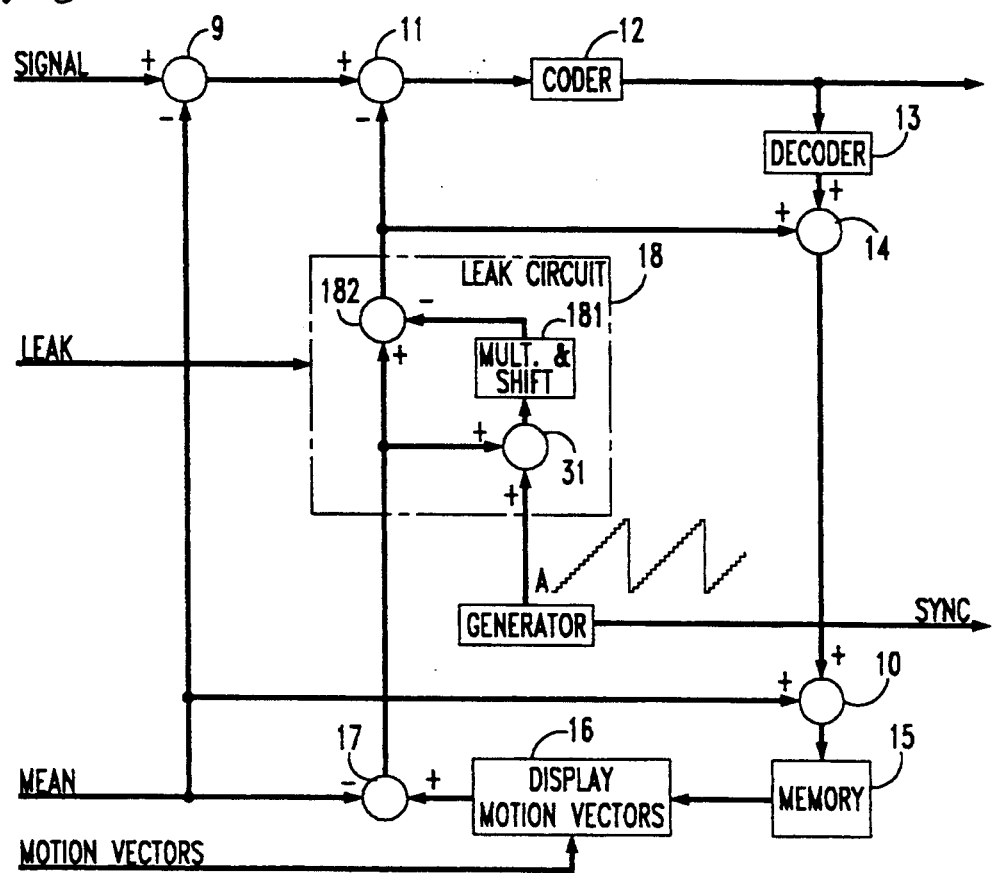
FIGS. 5 and 6 present another transmitter and receiver embodiment of this invention.
Figure 6:
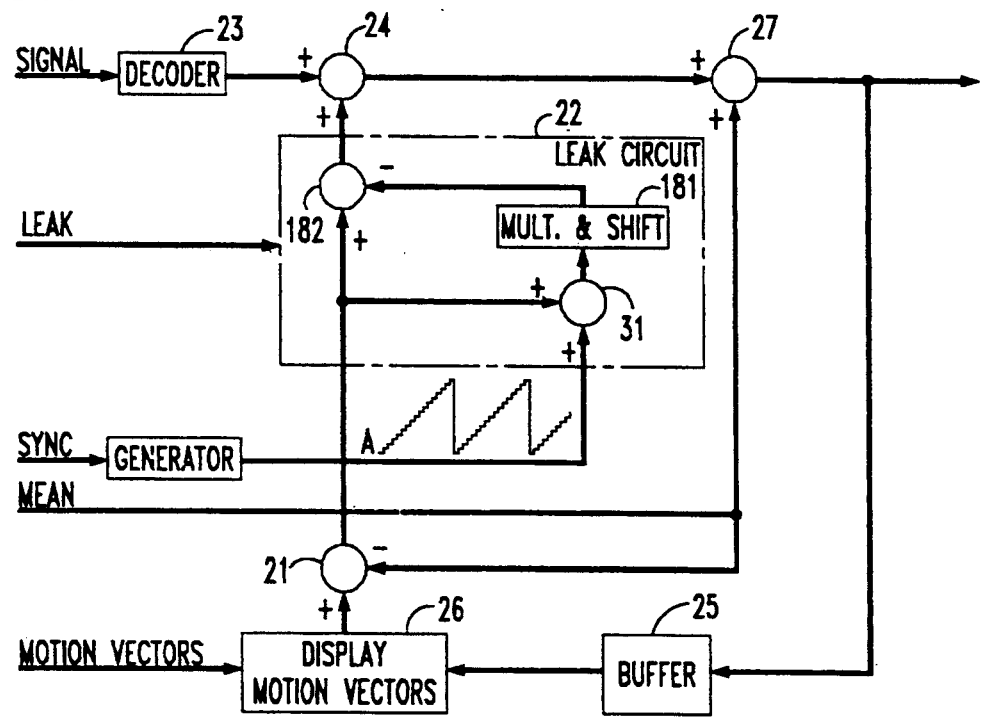

FIGS. 5 and 6 present another transmitter and receiver embodiment that carries out the principles of this invention. The FIG. 5 structure is identical to that of FIG. 1, except that an adder circuit 31 is interposed in the signal path leading to shift circuit 181 to add signal A. FIG. 6 follows suit with adder 32 which adds augmentation signal A.

It is interesting to note that for the sawtooth A signal of FIGS. 5 and 6 and a fiat signal of level 129, the pattern of signals sent by the FIG. 5 transmitter to the FIG. 6 receiver is 15 signals of level 8 followed by 1 signal of level 9. A receiver that starts with 0 level in its buffer has the buffer raised in steps as follows: 8, 16, 23, 30, 36, 42, 47, 52, 57, 61, 65, 69, 72, 75, 78, 82, 85, 88, 91, 94, 96, 98, 100, 102, 104, 105, 106, 107, 108, 109, 110, 112, 113, 114, 115, 116, 117, 118, 119, 120 (8), 121, 122, 123, 124, 125 (12 times), 126, 127 (15 times), 128 (16 times), 129 .

. . . . Correspondingly, a level 130 signal sends a pattern of 14 signals of level 8 followed by 2 signals of level 9, etc. The circuitry for creating the sawtooth signal is not described herein because of its great simplicity and because the sawtooth signal is just one of any number of signals that may be used, as disclosed above.

Although not absolutely necessary, it is useful to synchronize signals A in both the encoder and the decoder. That suggests that the encoder must send a signal to the decoder to cause the synchronization. Such a signal needs to occur fairly infrequently, so it does not represent a burden to the transmission medium. Even the entire signal A can be sent to the decoder without much of a burden.

We claim:

1. Apparatus having a first means responsive to an input signal and an attenuated prediction signal for creating a desired output signal and a second means responsive to a prediction signal and to a leak control signal for creating the attenuated prediction signal, the improvement comprising:
    third means for temporally altering the attenuated prediction signal with the aid of a truncation-correction (TC) control signal.

2. The apparatus of claim 1 wherein the TC control signal is independent of any signal related to the input signal.

3. The apparatus of claim 1 wherein the TC control signal is periodic.

4. The apparatus of claim 1 wherein the second means comprises an attenuation circuit that is responsive to the third means, and the third means comprises circuitry for developing the TC control signal.

5. The apparatus of claim 1 wherein:
    said second means comprises a multiply circuit responsive to a prediction signal, and a truncated division circuit responsive to the multiply circuit; and
    the third means comprises an adder circuit interposed between the multiply circuit and the truncated division circuit for adding the TC control signal to the signal applied to the truncated division circuit.

6. The apparatus of claim 5 further comprising a subtractor responsive to the prediction signal and to the output signal of the truncated division circuit.

7. The apparatus of claim 1 wherein the TC control signal is a periodic clocked signal with a period of N clock pulses and a different level, in the range 0 to N-1, in each of the N clock pulses, where N is related to the leak control signal.

8. The apparatus of claim 7 wherein the TC control signal is a ramp signal.

9. The apparatus of claim 7 wherein the TC control signal is a ramp signal with bits reversed.

10. The apparatus of claim 1
    wherein the second means comprises an attenuation circuit in series with an offset subtraction circuit, and the offset subtraction circuit cooperates with the third means to temporally alter the attenuated prediction signal, and
    wherein the third means develops the TC control signal.

11. The apparatus of claim 10 wherein the third means develops a sync signal in synchronism with the TC control signal.

12. The apparatus of claim 10 wherein the third means develops the TC control signal under control of an applied sync signal and causes the output signal developed by the offset subtraction circuit to have the TC control signal added thereto.

13. The apparatus of claim 1 wherein:
said second means comprises a truncated division circuit responsive to a prediction signal and
a subtractor responsive to the prediction signal and to the output signal of the shift circuit, and
the third means comprises an adder circuit interposed between the prediction signal and the truncated division circuit for adding the TC control signal to the prediction signal prior to its application to the truncated division circuit.

14. The apparatus of claim 13 wherein the truncated division circuit is a shift circuit.

15. The apparatus of claim 13 wherein the third means further comprises means for developing the TC control signal.

16. The apparatus of claim 13 wherein the third means further comprises means for developing the TC control signal synchronously with an applied sync signal.

* * * * *

UNITED STATES PATENT AND TRADEMARK OFFICE
CERTIFICATE OF CORRECTION

PATENT NO. : 5,367,336
DATED : 11/22/94
INVENTOR(S) : George J. Kustka et al

It is certified that error appears in the above-identified that said Letters Patent is hereby corrected as shown below:

On the title page, item [75] Inventors: should read as follows:

--[75] Inventors: George J. Kustka, Marlboro; John N. Mailhot, Somerville; Kim N. Matthews, Watchung, all of N.J.--.

Signed and Sealed this

Fifth Day of December, 1995

Attest:

BRUCE LEHMAN

Attesting Officer

Commissioner of Patents and Trademarks